US011644001B2

(12) United States Patent
Tsunota et al.

(10) Patent No.: US 11,644,001 B2
(45) Date of Patent: May 9, 2023

(54) DIRECT INJECTION FUEL INJECTION VALVE

(71) Applicant: HITACHI ASTEMO, LTD., Hitachinaka (JP)

(72) Inventors: Kenichi Tsunota, Hitachinaka (JP); Kenichi Uehara, Hitachinaka (JP)

(73) Assignee: Hitachi Astemo, Ltd., Tokyo (JP)

( * ) Notice: Subject to any disclaimer, the term of this patent is extended or adjusted under 35 U.S.C. 154(b) by 139 days.

(21) Appl. No.: 17/176,455

(22) Filed: Feb. 16, 2021

(65) Prior Publication Data

US 2021/0301774 A1    Sep. 30, 2021

(30) Foreign Application Priority Data

Mar. 27, 2020    (JP) .............................. JP2020-058755

(51) Int. Cl.
  F01D 1/00  (2006.01)
  F02M 61/18  (2006.01)

(52) U.S. Cl.
  CPC ...... F02M 61/188 (2013.01); F02M 61/1873 (2013.01)

(58) Field of Classification Search
  CPC .. F02M 61/188; F02M 61/166; F02M 51/061; F02M 2200/8084
  See application file for complete search history.

(56) References Cited

U.S. PATENT DOCUMENTS

| | | | |
|---|---|---|---|
| 6,131,826 A | 10/2000 | Teiwes | |
| 6,168,095 B1 | 1/2001 | Seitter et al. | |
| 6,543,424 B1 * | 4/2003 | Yamaguchi | F04B 53/14 |
| | | | 123/495 |
| 9,546,627 B2 | 1/2017 | Okamoto et al. | |

(Continued)

FOREIGN PATENT DOCUMENTS

| | | |
|---|---|---|
| JP | H07-54736 A | 2/1995 |
| JP | 2001-507097 A | 5/2001 |

(Continued)

OTHER PUBLICATIONS

Official Communication issued over the corresponding Japanese Patent Application No. 2020-058755.

(Continued)

*Primary Examiner* — John Kwon
(74) *Attorney, Agent, or Firm* — Carrier Shende & Associates, P.C.; Joseph P. Carrier; Fulchand P. Shende

(57) ABSTRACT

A direct injection fuel injection valve includes a valve casing housing therein a valve member and fitted into an engine main body of an internal combustion engine. The casing includes: a tubular case member; and a valve seat member joined to one end part thereof and having a valve seat and a fuel injection hole. The valve member can be in contact with and detached from the valve seat. The injection hole is opened and closed by cooperation between the valve seat and the valve member. At least part of the valve seat member is exposed to a combustion chamber of the engine main body. Fuel can be injected into the combustion chamber via (Continued)

the injection hole. The valve seat member is formed from a martensitic stainless steel having a PI value of at least 19, containing at least N, and having a C content of no greater than 0.3%.

2 Claims, 6 Drawing Sheets

(56) References Cited

U.S. PATENT DOCUMENTS

| | | | | |
|---|---|---|---|---|
| 2002/0175476 | A1* | 11/2002 | Chinou | F16J 9/26 |
| | | | | 277/440 |
| 2010/0001215 | A1* | 1/2010 | Suzuki | F02M 51/0678 |
| | | | | 251/129.01 |
| 2014/0224903 | A1* | 8/2014 | Fujino | F02M 21/0254 |
| | | | | 239/584 |

FOREIGN PATENT DOCUMENTS

| | | |
|---|---|---|
| JP | 2007-277639 A | 10/2007 |
| JP | 2013-181409 A | 9/2013 |
| JP | 2014-092061 A | 5/2014 |
| JP | 2019-027348 A | 2/2019 |

OTHER PUBLICATIONS

Office Action dated Nov. 29, 2022 issued in the corresponding Chinese Patent Application No. 202110318813.5.

* cited by examiner

DIRECT INJECTION FUEL INJECTION VALVE

CROSS REFERENCE TO RELATED APPLICATIONS

The present application claims priority under 35 U.S.C. § 119 to Japanese Patent Application No. 2020-58755 filed Mar. 27, 2020 the entire contents of which are hereby incorporated by reference.

BACKGROUND OF THE INVENTION

Field of the Invention

The present invention relates to a fuel injection valve, particularly, a direct injection fuel injection valve comprising a valve casing fitted into an engine main body of an internal combustion engine, the valve casing housing therein a valve member, the valve casing including a valve seat member and a tubular case member, the valve seat member having a valve seat and a fuel injection hole, the valve seat member being joined to one end part of the case member, the valve member being capable of being in contact with and being detached from the valve seat, the fuel injection hole being opened and closed by cooperation between the valve seat and the valve member, at least part of the valve seat member and the case member being exposed to a combustion chamber of the engine main body, and fuel being capable of being injected into the combustion chamber via the fuel injection hole.

Description of the Related Art

The direct injection fuel injection valve as described above is conventionally known as shown in Japanese Patent Application Laid-open No. 2014-92061.

Conventionally, an exhaust gas recirculation technique in which part of the exhaust gas is added to an air intake to thus decrease the combustion temperature has been widely used for the purpose of exhaust gas purification of an internal combustion engine, fuel consumption improvement, etc. In recent years, in order to further reduce the combustion temperature, a technique in which exhaust gas (that is, COOLED EGR gas) cooled by means of a heat exchanger is recirculated to an air intake is also known.

However, in the latter technique, strongly acidic condensed water is generated when cooling the recirculated EGR gas, and because of this there is a possibility that various types of equipment around the combustion chamber will be exposed to the strong acidity of the condensed water. In a direct injection fuel injection valve in particular, a valve seat member having part thereof exposed to the combustion chamber and a case member joined to the valve seat member are in a positional environment in which they are easily exposed to condensed water from exhaust gas; however, no special countermeasures have been taken for a valve seat member in a conventional direct injection fuel injection valve in order to ensure high corrosion resistance such that it can withstand the high acidity of condensed water.

SUMMARY OF THE INVENTION

The present invention has been accomplished in light of such circumstances, and it is an object thereof to provide a direct injection fuel injection valve for which a valve seat member has sufficiently high corrosion resistance compared with a conventional one, and which has excellent durability.

In order to achieve the object, according to a first aspect of the present invention, there is provided a direct injection fuel injection valve comprising a valve casing fitted into an engine main body of an internal combustion engine, the valve casing housing therein a valve member, the valve casing including a valve seat member and a tubular case member, the valve seat member having a valve seat and a fuel injection hole, the valve seat member being joined to one end part of the case member, the valve member being capable of being in contact with and being detached from the valve seat, the fuel injection hole being opened and closed by cooperation between the valve seat and the valve member, at least part of the valve seat member and the case member being exposed to a combustion chamber of the engine main body, and fuel being capable of being injected into the combustion chamber via the fuel injection hole, wherein the valve seat member is formed from a martensitic stainless steel having a PI value of at least 19, containing at least N, and having a C content of no greater than 0.3%.

In accordance with the first aspect, in the direct injection fuel injection valve, since the valve seat member is formed from a martensitic stainless steel having a PI value of at least 19, containing at least N, and having a C content of no greater than 0.3%, the valve seat member can exhibit sufficiently high corrosion resistance compared with a conventional product, and even when the valve seat member is exposed to highly acidic condensed water of for example exhaust gas, etc., it is thereby possible to suppress effectively the influence of the strong acid, thus greatly contributing to improvement of the durability of the direct injection fuel injection valve.

According to a second aspect of the present invention, in addition to the first aspect, the case member, which integrally has an outward flange-shaped annular collar portion functioning as a yoke, is formed from a ferritic stainless steel containing at least one of Nb, Ti, and Zr, and the valve seat member is directly welded to the one end part of the case member.

In accordance with the second aspect, since the case member integrally having an outward flange-shaped annular collar portion functioning as a yoke is formed from a ferritic stainless steel containing at least one of Nb, Ti, and Zr, and the valve seat member is directly welded to the one end part, even if a base material portion that directly receives welding heat at the time of welding the valve seat member and the case member to each other re-melts, due to a carbide of Nb, Ti, or Zr contained in the case member being deposited in the re-melted portion, re-deposition of a Cr carbide, which is the main cause of deterioration of the corrosion resistance, is suppressed effectively. Not only is it thereby possible to suppress any deterioration of the corrosion resistance of the case member caused by the influence of welding heat, but it is also possible to suppress effectively any deterioration of the joining strength of the welded part between the valve seat member and the case member, that is, the weld strength, caused by the influence of welding heat.

According to a third aspect of the present invention, in addition to the first or second aspect, the valve seat member has in an inner peripheral face thereof a valve guide hole formed into a polygonal shape in which a plurality of flat portions and a plurality of inside angle portions are alternatingly arranged in a peripheral direction, the valve guide hole slidingly guiding the valve member, and at least one member of the valve seat member and the case member is molded by forging.

In accordance with the third aspect, since the valve seat member has in the inner peripheral face the valve guide hole formed into a polygonal shape in which the plurality of flat portions and the plurality of inside angle portions are alternatingly arranged in the peripheral direction and slidingly guide the valve member, and at least one member of the valve seat member and the case member is molded by forging, a reduction in cost can be anticipated due to the forging and, moreover, since the effect of reducing the amount of Cr carbide deposited can be obtained, the number of cracking starting points decreases, the ease of upsetting during processing improves, and the moldability can be enhanced.

It should be noted here that 'PI value' is an acronym from Pitting Index, is an index generally known and used as an evaluation index for the pitting resistance of stainless steel, and is specifically defined by PI value=Cr content+(3.3×Mo content)+(16×N content).

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention are explained below based on the attached drawings. In the present specification, the 'axial direction', 'radial direction', and 'peripheral direction' are defined with a central axis X of an electromagnetic fuel injection valve I as a reference; for example, a direction along the central axis X is the axial direction, a direction of a radius with the central axis X as a center is the radial direction, and a circumferential direction with the central axis X as a center is the peripheral direction. In the present specification, the fuel injection side along the axial direction of the electromagnetic fuel injection valve I is referred to as the front side, and the side opposite thereto is referred to as the rear side.

Figure 1:
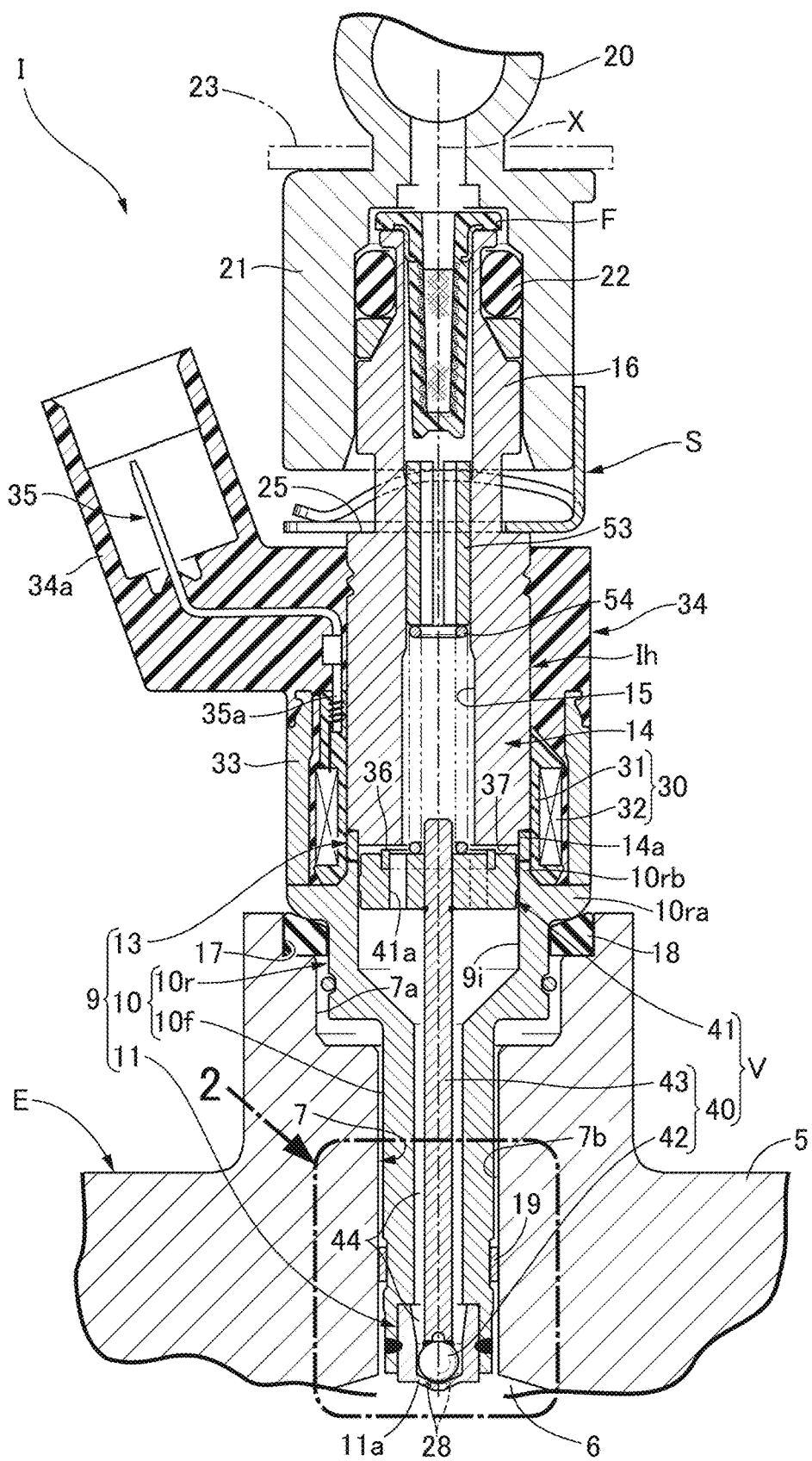
FIG. 1 is a longitudinal sectional view showing one example of a state in which a direct injection fuel injection valve related to embodiments of the present invention is mounted on an internal combustion engine.

First, in FIG. 1, an engine main body of an internal combustion engine E, for example a cylinder head 5, is provided with a valve mounting hole 7 opening in a combustion chamber 6, and the fuel injection valve I, which is an electromagnetic and direct injection type and is capable of injecting fuel toward the combustion chamber 6 is fitted into the valve mounting hole 7.

The internal combustion engine E of the present embodiments includes an exhaust gas recirculation device, which is not illustrated, that circulates part of the exhaust gas within an exhaust pipe to an intake system according to the engine operating conditions, and a heat exchanger for cooling the exhaust gas to be recirculated, that is, EGR gas, is disposed partway along the exhaust gas recirculation path.

One example of the direct injection fuel injection valve I provided in the internal combustion engine E is explained below. A valve housing Ih of the fuel injection valve I is formed by superimposing in sequence a stepped cylindrical valve casing 9 having a fuel injection part at the front end, a cylindrical fixed core 14 joined to the rear end of the valve casing 9, and a fuel inlet tube 16 integrally connected by the same material to the rear end of the fixed core 14.

The valve casing 9 houses a valve assembly V as a valve member so that it can move back-and-forth, and includes a bottomed cylindrical valve seat member 11 having a bottom wall portion 11a at the front end, a cylindrical case member 10 having its front end part fitted onto and welded to the valve seat member 11, and a short cylindrical non-magnetic member 13 abutted against and welded to the rear end of the case member 10.

Figure 2:
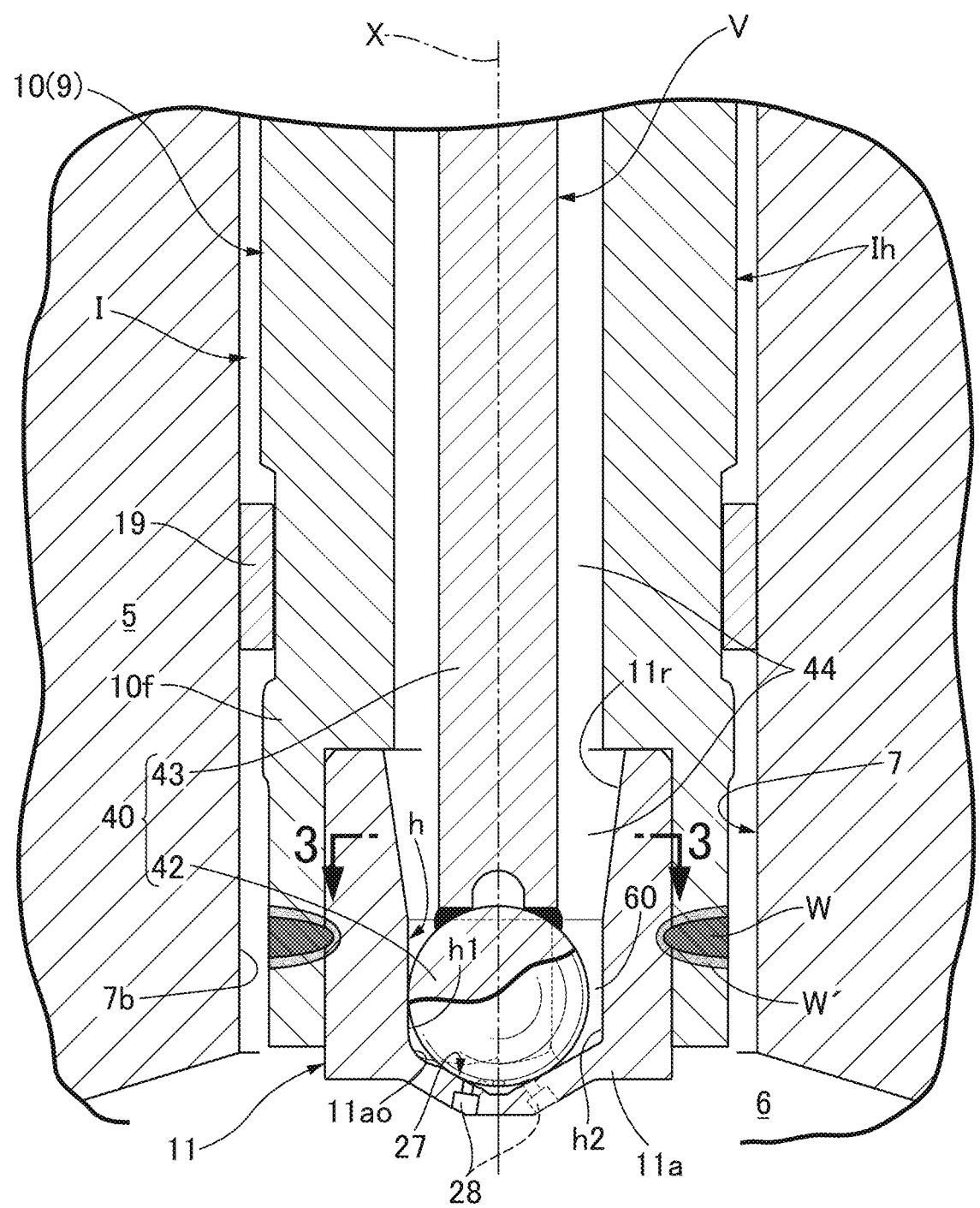
FIG. 2 is an enlarged sectional view of an essential part of a valve casing of the fuel injection valve (an enlarged view of part shown by arrow 2 in FIG. 1, a sectional view along line 2-2 in FIG. 3).
Figure 3:
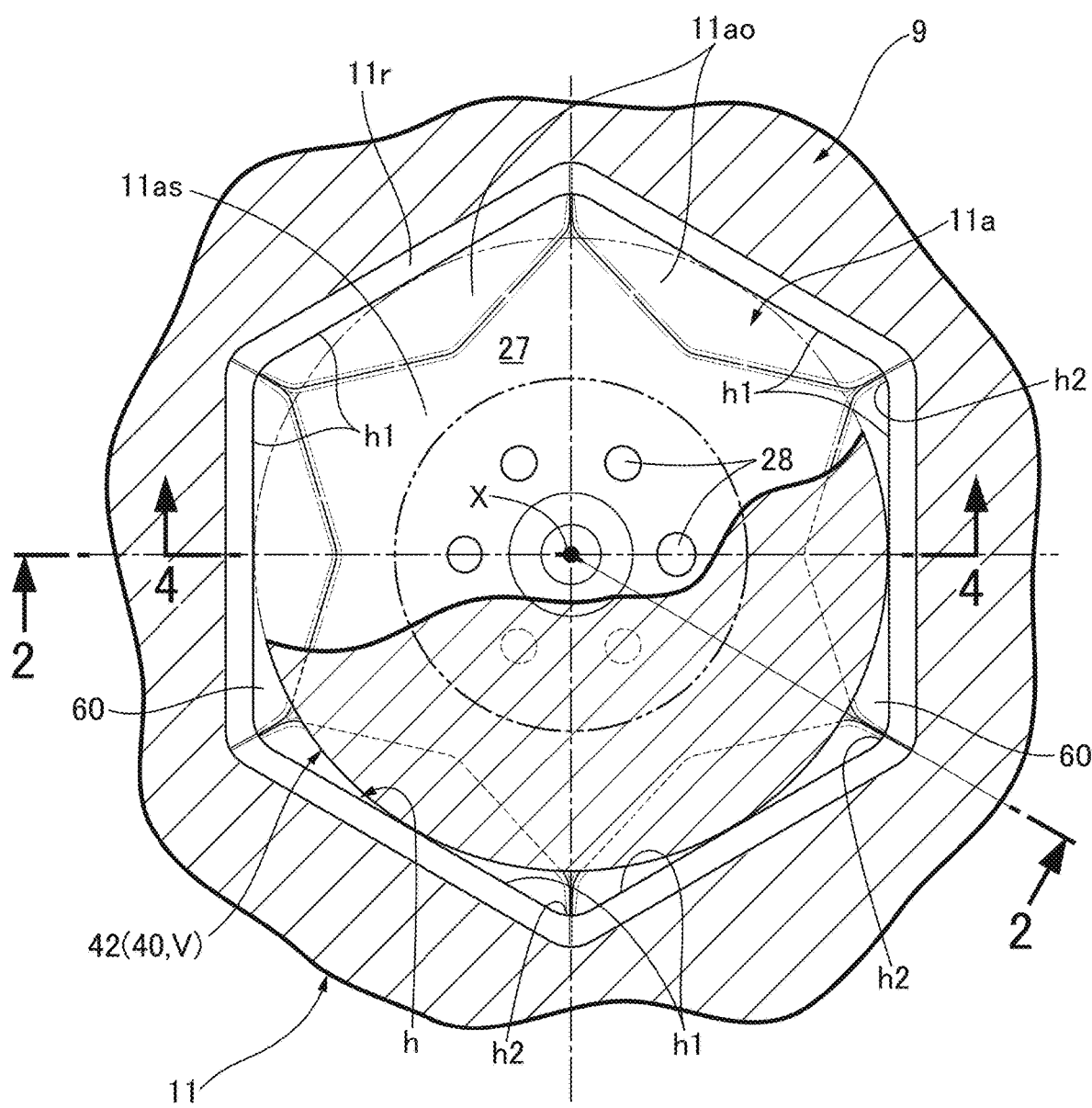
FIG. 3 is a sectional view along line 3-3 in FIG. 2.
Figure 4:
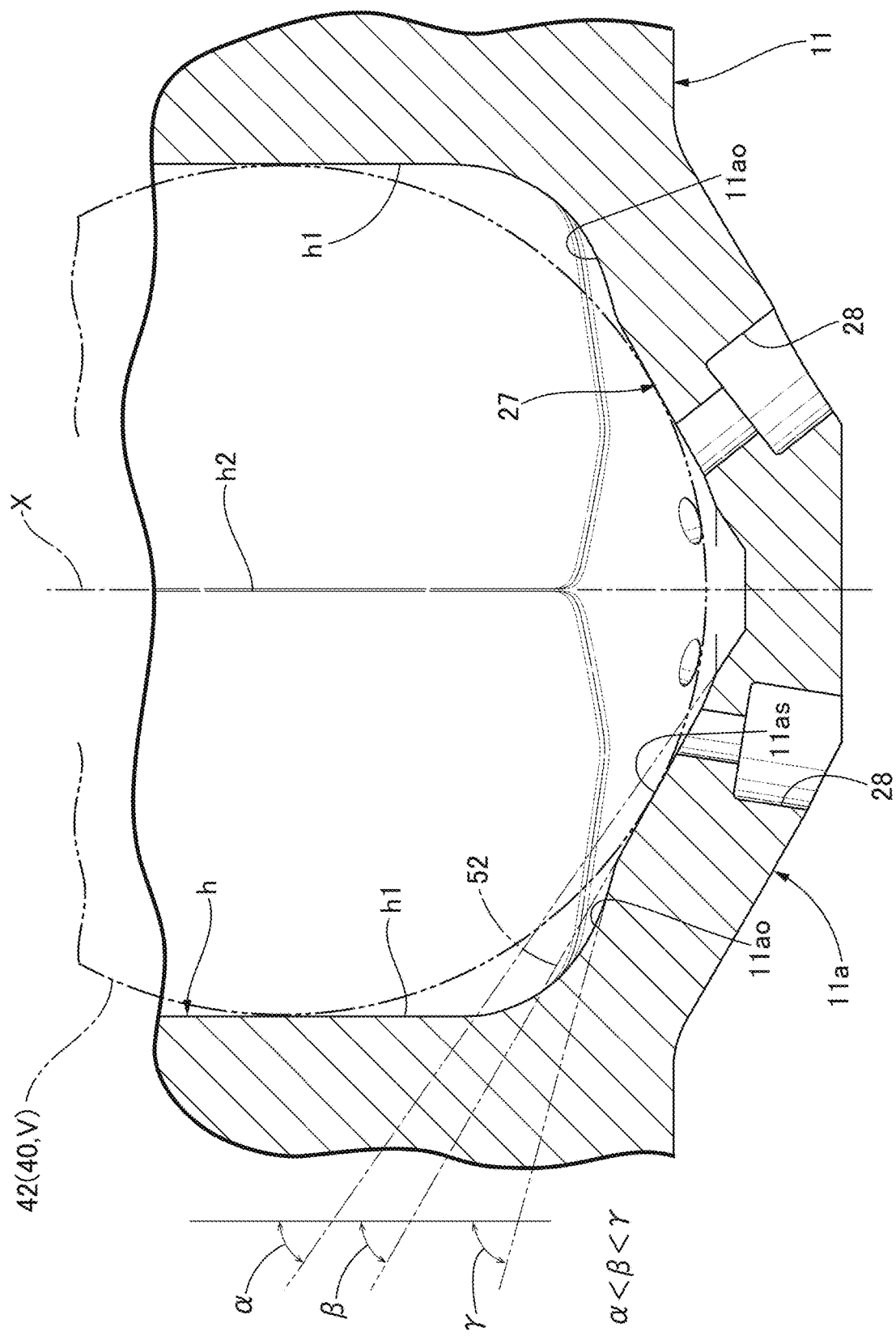
FIG. 4 is a sectional view along line 4-4 in FIG. 3.

One example of the valve seat member 11 is now explained by referring in addition to FIG. 2 to FIG. 4. With regard to the valve seat member 11, an outer face of the bottom wall portion 11a thereof faces the combustion chamber 6, and the bottom wall portion 11a is provided with a conical valve seat 27 and a plurality of fuel injection holes 28, the fuel injection holes 28 having their inner ends opening in the vicinity of the center of the valve seat 27 and being arranged at intervals from each other in the peripheral direction. The outer end of the fuel injection holes 28 opens in the combustion chamber 6.

With regard to the valve seat member 11, a rear-half inner peripheral face 11r thereof is formed into a cylindrical face, and a front-half inner peripheral face thereof connecting the rear-half inner peripheral face 11r and the large diameter end of the valve seat 27 functions as a valve guide hole h. That is, the valve guide hole h slidably and guidingly supports a valve part 42, which is described later, and in this embodiment, as is clear from FIG. 3, the valve guide hole h is formed into a regular hexagonal shape in which a plurality of flat portions h1 and a plurality of inside angle portions h2 are alternatingly arranged in the peripheral direction. The central axis of the valve guide hole h coincides with the central axis X of the fuel injection valve I.

With regard to the rear-half inner peripheral face 11r of the valve seat member 11, flat portions connected to the plurality of flat portions h1 are formed into a tapered shape so as to gradually enlarge a fuel flow path 44 from the front-half inner peripheral face, that is, the valve guide hole h, toward the rear end of the rear-half inner peripheral face 11r.

The valve seat 27, which is formed from an inner face (upper face) of the bottom wall portion 11a of the valve seat member 11, is formed into a substantially conical face shape, and as is clear from FIG. 4 it is formed so that an opening angle β of an intermediate inner face part (that is, a seat face 11as) on which the fuel injection hole 28 opens is larger than an opening angle α of an inner face part in the vicinity of the center, and an opening angle γ of an inner face portion 11ao on the outer peripheral side is yet larger. In this case, as is clear from FIG. 4, the inner face portion 11ao on the outer peripheral side is formed so that it is recessed deeper than an imaginary extension face 52 of the seat face 11as so as to have an arc-shaped cross section at positions corresponding to the plurality of flat portions h1 (valve guide face) of the valve guide hole h, and an outer peripheral end part thereof rises so as to be smoothly continuous with the valve guide hole h. The fuel passage heading toward the seat face 11as is therefore expanded by forming a depression in the inner face portion 11ao on the outer peripheral side, and in accordance with such a mode for the valve seat 27 the following advantages can be obtained.

That is, in the direct injection fuel injection valve, in order to enhance the combustion efficiency of the internal combustion engine the valve seat member 11 is required to have high precision, and ensuring the precision is the main cause of high cost. In accordance with the effect of specially providing a depression in the inner face portion 11ao on the outer peripheral side, it becomes possible to suppress variation of injection performance due to variation in the precision of the valve seat member 11. That is, due to an enlarged communication fuel passage (the depression) being formed in the valve seat 27 at positions corresponding to the plurality of flat portions h1 (valve guide face) of the valve guide hole h, fuel can evenly and smoothly flow toward the seat face 11as side not only from the inside angle portion h2 but also from the entire peripheral area of the valve guide hole h, and it becomes possible to inject fuel from the plurality of fuel injection holes 28 with good balance.

The cross-sectional shape of the valve guide hole h may be a rectangular polygon other than the regular hexagon in the illustrated example, or may be a polygon in which the plurality of flat portions h1 have different lengths. The phases (that is, the positions in the peripheral direction) of the fuel injection hole 28 and the inside angle portion h2 of the valve guide hole h may be made to coincide or may not be made to coincide.

In addition, in the present embodiments the fuel injection hole 28 formed directly in the bottom wall portion 11a of the valve seat member 11 is illustrated, but a fuel injection hole may be formed in an injector plate (not illustrated) made of a steel plate that is fixed afterward to a front end part of the valve seat member 11, and in this case a fuel injection hole is provided in the valve seat member 11 via the injector plate.

On the other hand, the case member 10 is formed into a stepped cylindrical shape while having a cylindrical small diameter tube portion 10f extending lengthwise in the axial direction and having the valve seat member 11 fitted into and welded to the inner periphery of the front end part thereof, and a large diameter tube portion 10r connected to the rear end of the small diameter tube portion 10f via an annular step part and formed into a cylindrical shape having a larger diameter than that of the small diameter tube portion 10f.

Figure 5:
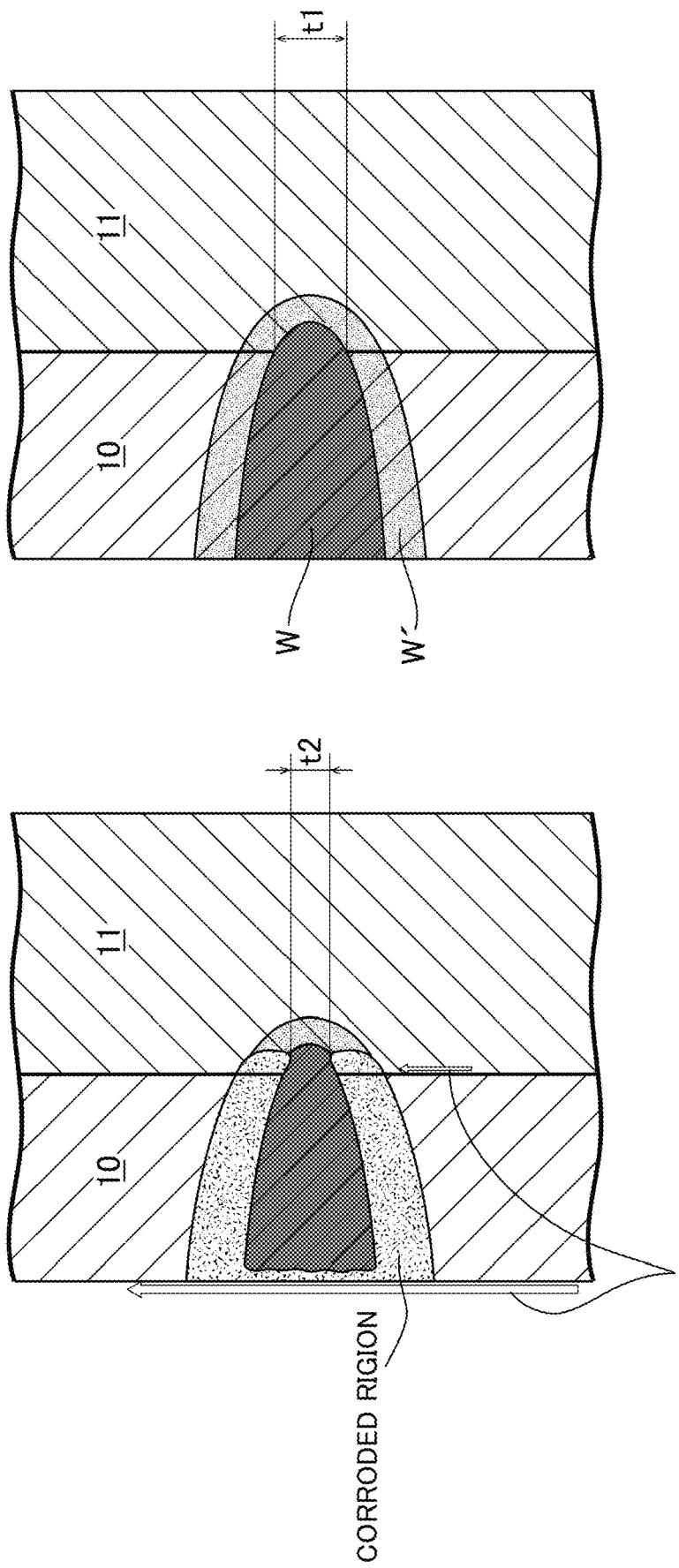
FIGS. 5A and 5B each show an enlarged sectional view of an essential part of the valve casing displaying in an enlarged manner one example of a part where a valve seat member and a case member are welded to each other and its surroundings, FIG. 5A showing the state before exposing a test piece to a test solution (that is, before being corroded) and FIG. 5B showing the state after exposing the test piece to the test solution (that is, after being corroded).

When joining the case member 10 and the valve seat member 11, the valve seat member 11 is first press fitted into the inner periphery of a front end part of the small diameter tube portion 10f. Subsequently, in this state heat is applied from the outer side in the radial direction of the small diameter tube portion 10f by means of a welding machine (e.g. a laser welding machine) to thus carry out a welding step in which the small diameter tube portion 10f and the valve seat member 11 are melted by the heat and solidified. As illustrated in FIG. 2 and FIG. 5A, a welding heat-affected part W where a base material is affected by the application of heat at the time of welding is therefore present in an area around a welded part W generated between the small diameter tube portion 10f and the valve seat member 11.

In particular, the large diameter tube portion 10r functions as a yoke that works in cooperation with a coil 32, etc., which is described later, integrally has an outward flange-shaped annular collar portion 10ra on the outer periphery of a rear part thereof, and integrally has a connecting tube portion 10rb at the rear end of the large diameter tube portion 10r, the connecting tube portion 10rb being abutted against and welded to the front end of the non-magnetic member 13. With regard to an inner peripheral face 9i of the valve casing 9, a region from a rear half part of the large diameter tube portion 10r to the rear end of the non-magnetic member 13 is formed flush by means of cutting machining, that is, it is a cylindrical face in which each part has an equal diameter.

The valve seat member 11 is formed from a martensitic stainless steel having a PI value of at least 19, containing at least N, and having a C content of no greater than 0.3%. On the other hand, the case member 10 is formed from a ferritic stainless steel containing at least one of Nb, Ti, and Zr.

Moreover, both the valve seat member 11 and the case member 10 are molded by forging. Due to the valve seat member 11 in particular being forged, molding of the valve guide hole h, which has a complicated cross-sectional shape (e.g. a polygonal shape), can be carried out with good precision and at low cost.

An annular recess portion 14a is formed in the outer periphery of a front end part of the fixed core 14, and a rear end part of the non-magnetic member 13 is press fitted and liquid-tightly welded to the annular recess portion 14a so that an outer peripheral face of the non-magnetic member 13 is connected to the fixed core 14.

The valve mounting hole 7 of the cylinder head 5 includes a small-diameter hole portion 7b having one end opening in the combustion chamber 6, and a large-diameter hole portion 7a connected to the other end of the small-diameter hole portion 7b via a step part. An annular recess part 17 is provided in the opening edge, on the side opposite to the combustion chamber 6, of the large-diameter hole portion 7a, and a tolerance ring 18 made of metal is fitted into and housed in the annular recess part 17.

In a valve-mounted state (see FIG. 1) in which the fuel injection valve I is fitted into and fixed to the valve mounting hole 7, the small diameter tube portion 10f is fitted into the small-diameter hole portion 7b and the large diameter tube portion 10a is fitted into the large-diameter hole portion 7a, the tolerance ring 18 being clamped between the annular recess part 17 and the annular collar portion 10ra in the valve-mounted state based on the resilient force of an elastic member S, which is described later.

A seal ring 19 is fitted into a shallow annular groove formed in the outer periphery of an intermediate part of the small diameter tube portion 10f of the present embodiments, the outer peripheral face of the seal ring 19 being press fitted into the small-diameter hole portion 7b. The seal ring 19 seals an annular gap between the small diameter tube portion 10f and the small-diameter hole portion 7b, thereby preventing the tolerance ring 18 from being exposed to high temperature gas of the combustion chamber 6.

In this way, an outer face of a front half part of the valve seat member 11 (specifically, an outer face of the bottom wall portion 11a and an outer peripheral face of the front half part), an outer face of a portion, further on the front side than the seal ring 19, of the case member 10 (specifically, a front end face and an outer peripheral face), and the welded part W between the valve seat member 11 and the case member 10 (specifically, an outer end face and a peripheral face around the gap between the valve seat member 11 and the case member 10) are exposed to the combustion chamber 6 or communicate with the combustion chamber 6, and are arranged so as to be exposed to combustion gas generated in the combustion chamber 6.

A fuel filter F is fitted into an inlet opening in a rear end part of the fuel inlet tube 16, and the fuel inlet tube 16 is fitted, via an annular seal member 22, into a fuel supply cap 21 provided on a fuel distribution pipe 20. A bracket 23 is latched onto an apex part of the fuel supply cap 21, and the bracket 23 is detachably fastened by appropriate fixing means (e.g. a bolt) to a support post, which is not illustrated, standingly provided on the cylinder head 5.

The elastic member S, which is formed from a plate spring, is disposed in a resiliently compressed state between a front end part of the fuel supply cap 21 and an annular step part 25 projectingly provided on the outer periphery of an intermediate part of the fuel inlet tube 16 and facing the fuel supply cap 21 side. The fuel inlet tube 16, that is, the fuel injection valve I, is held under pressure between the cylinder head 5 and the fuel supply cap 21 by means of the resilient force exerted by the elastic member S, and in this arrangement the tolerance ring 18 is also held under pressure between the annular recess part 17 and the annular collar portion 10ra.

A valve body 40 and a movable core 41 are housed within the valve casing 9 extending from the valve seat member 11 to the non-magnetic member 13 via the case member 10. The valve body 40 includes the valve part 42, which is spherical and opens and closes the fuel injection hole 28 in cooperation with the valve seat 27, and a rod 43 that is linked (e.g. welded) to the valve part 42 and extends to the interior of the fixed core 14.

The valve part 42 is formed into a spherical shape that can slide against the valve guide hole h (more specifically, the plurality of flat portions h1) of the inner periphery of the valve seat member 11. A plurality of communication fuel passages 60 are therefore defined between the plurality of inside angle portions h2 of the valve guide hole h and an outer peripheral face of the spherical valve part 42, the communication fuel passage 60 providing communication between the valve seat 27 and an internal space of the rear half part of the valve seat member 11.

The rod 43 is formed so as to have a smaller diameter than that of the valve part 42 and extends loosely lengthwise within the valve seat member 11 and the case member 10. An annular fuel flow path 44 surrounding the rod 43 and extending in the axial direction is therefore defined between an outer peripheral face of the rod 43 and an inner peripheral face of the valve seat member 11 and inner peripheral face of the case member 10, the fuel flow path 44 communicating with the valve seat 27 via the communication fuel passage 60.

Furthermore, the movable core 41 is fitted and fixed (e.g. welded) to a rear end part of the rod 43, the movable core 41 being disposed so as to oppose a front end face of the fixed core 14, that is, an attracting face 37. The movable core 41 has a lengthwise hole 41a that provides communication between front and rear end faces thereof, and an outer peripheral part of the movable core 41 can slide against the inner peripheral face 9i of the valve casing 9. The valve body 40 and the movable core 41 thus form the valve assembly V as a valve member.

The fixed core 14 has a lengthwise hole 15 that provides communication between a hollow part of the fuel inlet tube 16 and a front side of the fixed core 14. The lengthwise hole 15 communicates with the fuel flow path 44 via the lengthwise hole 41a of the movable core 41.

A pipe-shaped retainer 53 equipped with a slit is press fitted into the lengthwise hole 15 of the fixed core 14, and a valve spring 54 urging the movable core 41 toward the closing side of the valve body 40 is provided in a compressed state between the retainer 53 and the movable core 41. In this arrangement, a set load of the valve spring 54 is adjusted by means of the depth to which the retainer 53 is press fitted into the lengthwise hole 15.

A ring-shaped stopper member 36 made of a non-magnetic material is embedded into and fixed in the movable core 41, the rear end of the stopper member 36 protruding slightly further than a rear end face, opposing the fixed core 14, of the movable core 41. The stopper member 36 forms a predetermined gap between opposing end faces of the fixed core 14 and the movable core 41 due to the stopper member 36 abutting against the front end face of the fixed core 14, that is, the attracting face 37, at the time of mutual magnetic attraction between the fixed core 15 and the movable core 41.

A coil assembly 30 is fitted onto an outer peripheral face of the valve housing Ih (more specifically, an outer peripheral face extending from the large diameter tube portion 10r of the case member 10 to the fixed core 14 via the non-magnetic member 13). The coil assembly 30 is formed into a cylindrical shape while having a bobbin 31 fitted onto the outer peripheral face and a coil 32 wound around the bobbin 31. A front end part of a coil housing 33 formed from a magnetic material into a cylindrical shape so as to surround the coil assembly 30 is joined, for example welded, to the large diameter tube portion 10r (more specifically, a rear side face of the annular collar portion 10ra) of the case member 10.

The bobbin 31 and the coil 32 have a cylindrical shape, and the central axes thereof coincide with the central axis X of the fuel injection valve I. A base end portion 35a of a coupler terminal 35 protruding toward one side of the bobbin 31 is retained by a rear end part of the bobbin 31, and a terminal of the coil 32 is connected to the base end portion 35a.

The outer periphery of a rear part of the fixed core 14 is covered by a covering layer 34 molded from a synthetic resin so as to be connected to a rear end part of the coil housing 33, and a coupler 34a retaining the coupler terminal 35 is formed integrally with the covering layer 34 so as to protrude toward one side of the direct injection fuel injection valve I.

The coil housing 33 forms a magnetic circuit between the valve casing 9 (the case member 10 in particular) and the fixed core 14 when the coil 32 is energized, and is capable of making the movable core 41 (and consequently the valve assembly V) be magnetically attracted to the fixed core 14, the valve body 40 thus operating to open the valve so as to move in the valve opening direction (that is, move away from the valve seat 27) against the valve closing force of the valve spring 54. Accompanying this, a flow of high pressure fuel is formed from an external fuel supply source toward the fuel injection hole 28 side via, in sequence, the fuel distribution pipe 20, the fuel supply cap 21, the fuel inlet tube 16, the lengthwise holes 15, 41a of the fixed core 14 and movable core 41, the fuel flow path 44 within the valve casing 9, and the communication fuel passage 60 around the valve part 42, and high pressure fuel is injected into the combustion chamber 6 via the fuel injection hole 28.

The operation of the embodiments is now explained.

When assembling the direct injection fuel injection valve I, for example, the valve seat member 11, the valve casing 9 without the valve seat member 11, the valve assembly V, the coil assembly 30, the coil housing 33, and the fixed core 14 equipped with the fuel inlet tube 16 are separately prepared in advance. The front end of the fixed core 14 is welded to the rear end of the valve casing 9 having the valve assembly V fitted into the interior thereof to thus assemble the valve housing Ih, the coil assembly 30 is fitted around the outer periphery thereof, the coil housing 33 is fitted further on the outer side thereof, and the front end of the coil housing 33 is welded to the valve casing 9 (specifically, to the annular collar portion 10ra on the outer periphery of the large diameter tube portion 10r of the case member 10). Subsequently, the valve seat member 11 is press fitted into the front end part of the small diameter tube portion 10f of the case member 10 and then welded.

Following this, a step of molding the covering layer 34 is carried out. That is, the covering layer 34 is molded around the valve housing Ih by means of injection molding using an insulating synthetic resin so as to embed the fixed core 14, the coil assembly 30, the rear end part of the coil housing 33, and the base end portion 35a of the coupler terminal 35. Subsequently, the valve spring 54 and the retainer 53 are fitted into the valve housing Ih from the fuel inlet tube 16 side, and the fuel filter F and the seal ring 22 are then mounted on the fuel inlet tube 16, thus completing the operation of assembly of the direct injection fuel injection valve I.

Figure 6:
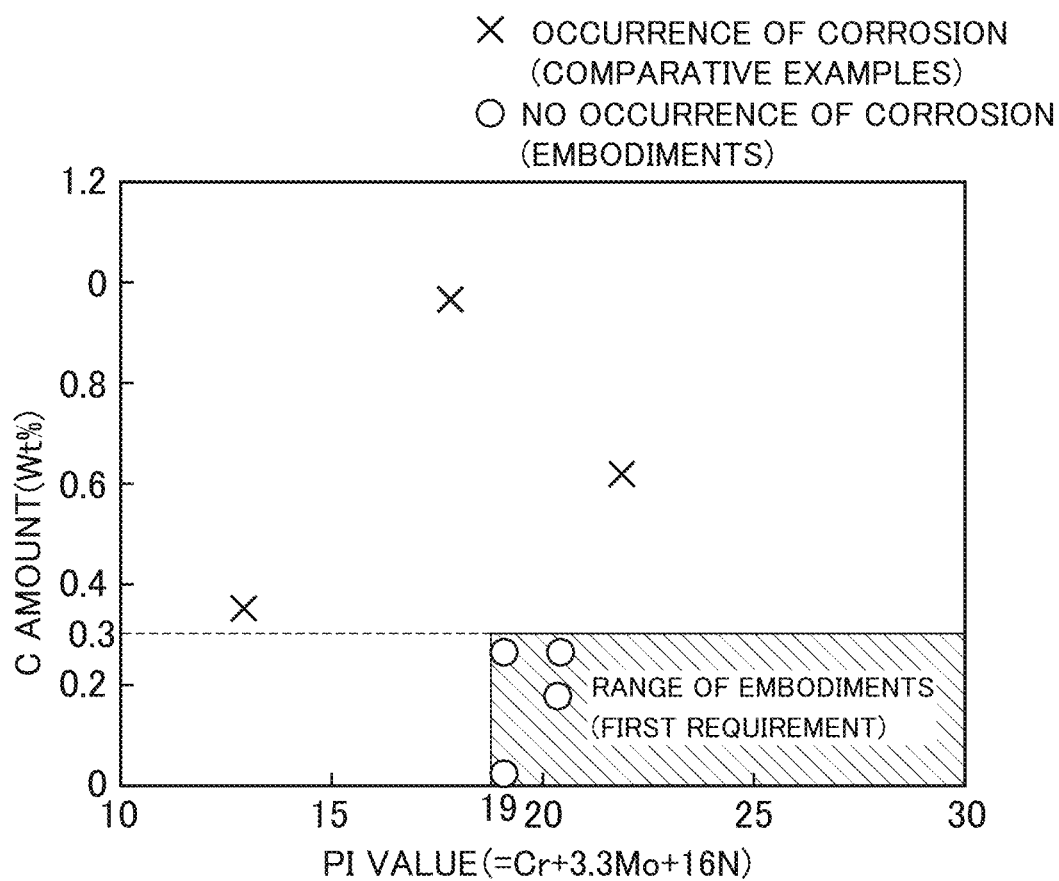
FIG. 6 is a graph showing the relationship between PI value and C content of a valve seat member formed from a martensitic stainless steel.

In the present embodiments, as described above the valve seat member 11 is formed from a martensitic stainless steel that satisfies the first requirement of 'having a PI value of at least 19, containing at least N, and having a C content of no greater than 0.3%', and the case member 10 is formed from a ferritic stainless steel that satisfies the second requirement of 'containing at least one of Nb, Ti, and Zr'; the reason why a stainless steel having such a composition is selected is now explained by referring in addition to Table 1, Table 2, and FIG. 6.

[Confirmation Test for First Requirement]

Several embodiments of the present invention in which the valve seat member 11 is made of a martensitic stainless that satisfies the first requirement and several comparative examples in which the valve seat member 11 is made of a martensitic stainless that does not satisfy the first requirement were prepared as test pieces. The test pieces of the embodiments and the comparative examples were subjected to a corrosion resistance test, and the results are listed in Table 1.

In accordance with such test results, the level of the effect in preventing corrosion is basically confirmed when the PI value, which is a general guideline for improvement of the corrosion resistance of stainless steel, is at least 19, but there are cases in which even when it is 19 or greater the corrosion resistance is evaluated as poor. It is surmised that the reason therefor is that, when the C content is as high as 0.62, even if the PI value is 19 or greater, the amount of carbide deposition, which is the main cause of degradation of the corrosion resistance, increases excessively, and corrosion is caused in a region where the content of Cr is decreased by a portion corresponding to the deposition. From the test results, it can be seen that when the C content is no greater than 0.3% a sufficient effect of preventing corrosion can be obtained.

It is widely known that, among components related to the PI value, N in particular suppresses the deposition of Cr carbide to thus improve the corrosion resistance. Therefore, without formally presenting confirmation test data, the addition of N is essential in the present embodiments (the first requirement in particular).

With regard to the evaluation test for corrosion resistance, taking into consideration that EGR gas contains NOx and SOx and EGR condensed water is formed after the EGR gas containing water is condensed to become strongly acidic, as a test solution, assuming it to be EGR condensed water, a nitric acid aqueous solution in which pure water is added to 1N nitric acid to adjust the pH to 1 and a sulfuric acid aqueous solution in which pure water is added to 1N sulfuric acid to adjust the pH to 2 are used. A test piece of the valve seat member 11 is immersed in the nitric acid aqueous solution at room temperature for 10 hours, and further immersed in the sulfuric acid aqueous solution at room temperature for 100 hours, and it is then determined whether or not corrosion is present in the test piece.

As a method of determining the presence of corrosion, for example, the surface or a cross section of a test piece is enlarged (e.g. 5000 times) by means of a scanning electron microscope and examined closely to thus determine if pitting and grain boundary corrosion are present and, furthermore, the weight of the test piece is measured before and after the test and the percentage weight change is calculated. Only when there is no corrosion (i.e. pitting and grain boundary erosion) on the surface and the cross section of the test piece and the percentage weight change is 0 is it determined that the corrosion resistance is good.

TABLE 1

| | | COMPARATIVE EXAMPLE 1 | COMPARATIVE EXAMPLE 2 | COMPARATIVE EXAMPLE 3 | EMBODIMENT 1 | EMBODIMENT 2 | EMBODIMENT 3 | EMBODIMENT 4 |
|---|---|---|---|---|---|---|---|---|
| CONTENT OF COMPONENT | C | 0.35 | 0.97 | 0.62 | 0.18 | 0.27 | 0.01 | 0.27 |
| | Cr | 12.6 | 16.4 | 17.6 | 13.0 | 13.5 | 19.0 | 12.0 |
| | Mo | — | 0.42 | 1.33 | 1.83 | 1.83 | — | 1.8 |
| | N | — | — | — | 0.08 | 0.06 | 0.016 | 0.05 |
| PI VALUE | | 12.6 | 17.8 | 21.9 | 20.3 | 20.4 | 19.2 | 19.2 |
| CORROSION RESISTANCE | | NG | NG | NG | OK | OK | OK | OK |
| EXAMPLES OF MATERIAL | | SUS420J2 | SUS440C | SUS440A | NSSC550 | TBN-6H | NSSC180 | |

FIG. 6 shows a graph in which the abscissa is PI value and the ordinate is C content, the test results of the embodiments and the comparative examples being plotted therein. As is clear from Table 1 and FIG. 6, with regard to the corrosion resistance of the valve seat member 11, all of the embodiments were good, and all of the comparative examples were poor.

As is clear from the above, since the valve seat member 11 of each embodiment is formed from a high hardness and high corrosion resistance martensitic stainless steel having a PI value of at least 19, containing at least N, and having a C content of no greater than 0.3%, sufficiently high corrosion resistance can be exhibited compared with a conventional product. Since this enables any influence of a strong acid on the valve seat member 11 to be suppressed even when it is exposed to highly acidic condensed water of exhaust gas (e.g. EGR gas), etc., the durability of the direct injection fuel injection valve I can be greatly improved.

[Confirmation Test for Second Requirement]

In this confirmation test, some test pieces prepared by welding the case member 10 and the valve seat member 11 to each other are immersed in a test solution by the same method as in a case of the corrosion resistance test for the valve seat member 11 on its own, and the presence or absence of corrosion (e.g. pitting and grain boundary erosion) on the surface and the cross section of the test pieces thus immersed is confirmed.

In this case, as the valve seat member 11a martensitic stainless steel having a composition that satisfies the first requirement (e.g. Embodiment 2 of Table 1) is used in common, but as the case member 10 to which the above is welded a test piece employing a ferritic stainless steel that satisfies the second requirement in particular is the embodiment of the present invention, and a test piece employing as the case member 10 a ferritic stainless steel that does not satisfy the second requirement is a comparative example. The test pieces of the embodiments and the comparative examples were subjected to confirmation of corrosion resistance and weld strength, and the results are listed in Table 2.

the gap between the case member 10 and the valve seat member 11 causes corrosion in the welding heat-affected part W around the gap and the welded part W in the vicinity thereof.

It is surmised that such corrosion occurs due to a base material portion that directly receives welding heat (that is, a portion that becomes the welded part W or the welding heat-affected part W' after solidifying) at the time the valve seat member 11 and the case member 10 are welded together re-melting and a Cr carbide, which is the main cause of degradation of the corrosion resistance, being easily re-deposited in the re-melted portion. Therefore, in the test pieces of the comparative examples, since the width over which the case member 10 and the valve seat member 11 are joined via the welded part W (that is, the joining strength) decreases compared with that prior to the test (t1>t2 in FIGS. 5A and 5B) and the weld strength deteriorates, evaluation in the test for weld strength is poor.

On the other hand, in the test pieces of the embodiments, since the case member 10 contains at least one of Nb, Ti, and Zr, and each of Nb, Ti, and Zr has the property of stabilizing C or N more than Cr does (that is, easily produces a carbide or a nitride), even if a base material portion (that is, a portion that becomes the welded part W or the welding heat-affected part W' after solidifying) receives welding heat at the time

TABLE 2

| | | COMPARATIVE EXAMPLE 4 | COMPARATIVE EXAMPLE 5 | EMBODIMENT 5 | EMBODIMENT 6 |
|---|---|---|---|---|---|
| CONTENT OF COMPONENT | C | 0.07 | 0.03 | 0.01 | 0.16 |
| | Cr | 16.3 | 16.5 | 19.0 | 18.5 |
| | Mo | — | — | — | 1.90 |
| | N | — | — | 0.016 | 0.005 |
| | Nb + Ti + Zr | 0 | 0 | Nb : 0.46 | Nb + Ti + Zr: 0.36 |
| CORROSION RESISTANCE | | NG | NG | OK | OK |
| WELD STRENGTH | | NG | NG | OK | OK |
| EXAMPLES OF MATERIAL | | SUS430 | SUS430 | NSSC180 | SUS444 |

As is clear from Table 2, with regard to the corrosion resistance of the case member 10, all of the embodiments were good, and all of the comparative examples were poor. With regard to the weld strength between the case member 10 and the valve seat member 11, all of the embodiments were good, and all of the comparative examples were poor.

In the test for evaluation of the corrosion resistance, etc. related to the welded part between the valve seat member 11 and the case member 10, the same test solution as that used in the test for evaluation of the corrosion resistance of the valve seat member 11 on its own was used as a test solution.

FIG. 5A shows the state of test pieces of the embodiments and comparative examples prior to them being immersed in the test solution, and FIG. 5B shows one example in a state in which corrosion has occurred in a test piece of the comparative example due to it being immersed in the test solution. On the other hand, it has been confirmed that no corrosion occurs in the test pieces of the embodiments even subsequent to them being immersed in the test solution, that is, they are in the same state as in FIG. 5A.

In FIG. 5A, as described above, the welding heat-affected part W, which is affected by the application of heat when the base material is welded, is present around the welded part W, and in the comparative examples in particular, as is clear from FIG. 5B, the strongly acidic test solution causes corrosion in the welding heat-affected part W and the welded part W from the outer surface side of the case member 10, and it has been confirmed that the test solution entering via of welding and re-melts, due to a carbide of Nb, Ti, or Zr contained in the case member 10 being deposited in the re-melted portion, re-deposition of a Cr carbide, which is the main cause of deterioration of the corrosion resistance, is thereby suppressed.

As a result, not only does the case member 10 itself have good corrosion resistance, but corrosion of the welded part W and the welding heat-affected part W between itself and the valve seat member 11 is also suppressed, a sufficient width is ensured for joining of the welded part W, and it becomes possible to suppress effectively deterioration of the joining strength, that is, the weld strength, due to the influence of corrosion.

Furthermore, the valve seat member 11 and the case member 10 of the present embodiments are both molded by forging in order to save cost, etc., and in the case of molding by forging, the number of cracking starting points decreases due to the amount of Cr carbide deposited during the molding process being reduced, and the ease of upsetting during processing is thereby improved.

Embodiments of the present invention are explained above, but the present invention is not limited to the above-mentioned embodiments and may be modified in a variety of ways as long as the modifications do not depart from the gist of the present invention.

For example, the embodiments illustrate a case in which each of the valve seat member 11 and the case member 10, which are the main components of the valve casing 9, is formed by forging, but at least one of the valve seat member 11 and the case member 10 may be formed by a processing method other than forging (e.g. casting, cutting machining, etc.).

Furthermore, the embodiments illustrate a case in which the valve seat member 11 is joined to the case member 10 by welding, but it may be joined by joining means other than welding (e.g. swaging, screw fitting, press fitting, etc.).

Moreover, the embodiments illustrate a case in which the internal combustion engine E includes an exhaust gas recirculation device and exhaust gas cooling means (a heat exchanger) for cooling EGR gas is disposed partway along the exhaust gas recirculation path, but the present invention may be applied to an internal combustion engine, not having such an exhaust gas recirculation device or exhaust gas cooling means, in which the strong acidity of condensed water of combustion gas or exhaust gas is a problem. For example, in an internal combustion engine equipped with an idling stop function, a case can be anticipated in which countermeasures against strong acidity of condensed water of combustion gas are necessary according to the application environment (e.g. a case in which idling stop frequently occurs while traveling in a town area, a combustion chamber is relatively easily cooled, and condensed water is therefore difficult to vaporize, etc.), and the present invention may be applied to such an internal combustion engine.

Furthermore, the embodiments illustrate a case in which the valve guide hole h of the valve seat member 11 slidably guiding the valve part 42 of the valve assembly V as a valve member is formed into a polygonal cross sectional shape, and the plurality of communication fuel passages 60 providing communication between the fuel flow path 44 and the valve seat 27 are defined between the inside angle portion h2 and the outer peripheral face of the spherical valve part 42, but the valve guide hole h of the valve seat member 11 may be formed into a circular cross sectional shape, that is, a cylindrical hole, and in this case at least one flat portion is provided on the outer peripheral face of the valve part 42, and the gap between the flat portion and a cylindrical inner peripheral face of the valve guide hole h may be a communication fuel passage providing communication between the fuel flow path 44 and the valve seat 27.

Moreover, the embodiments illustrate a case in which the movable core 41 is prepared separately from the rod 43 of the valve assembly V and is afterward mounted on and fixed (e.g. welded) to the rod 43, but the movable core 41 may be formed integrally with the rod 43, or it may be fitted to the rod 43 so that they can undergo relative sliding within a predetermined limited range.

What is claimed is:

1. A direct injection fuel injection valve comprising a valve casing fitted into an engine main body of an internal combustion engine, the valve casing housing therein a valve member, the valve casing including a valve seat member and a tubular case member, the valve seat member having a valve seat and a fuel injection hole, the valve seat member being joined to one of opposite end parts of the case member, the valve member being capable of being in contact with and being detached from the valve seat, the fuel injection hole being opened and closed by cooperation between the valve seat and the valve member, at least part of the valve seat member and the case member being exposed to a combustion chamber of the engine main body, and fuel being capable of being injected into the combustion chamber via the fuel injection hole, wherein the valve seat member is formed from a martensitic stainless steel having a PI value of at least 19, containing at least N, and having a C content of no greater than 0.3%, the case member integrally has, at an outer peripheral portion of the other of the opposite end parts thereof, an outward flange-shaped annular collar portion functioning as a yoke, the case member being formed from a ferritic stainless steel containing at least one of Nb, Ti, and Zr, and the valve seat member is, at a cylindrical outer peripheral wall thereof, directly welded to the one end part of the case member from an outer peripheral wall side of the case member.

2. The direct injection fuel injection valve according to claim 1, wherein the valve seat member has in an inner peripheral face thereof a valve guide hole formed into a polygonal shape in which a plurality of flat portions and a plurality of inside angle portions are alternatingly arranged in a peripheral direction, the valve guide hole slidingly guiding the valve member, and both of the valve seat member and the case member are molded by forging.

* * * * *